Jan. 24, 1956  J. L. GRATZMULLER  2,732,180
SAFETY DEVICE FOR CABLE CONNECTIONS
Filed Feb. 2, 1953  4 Sheets-Sheet 1
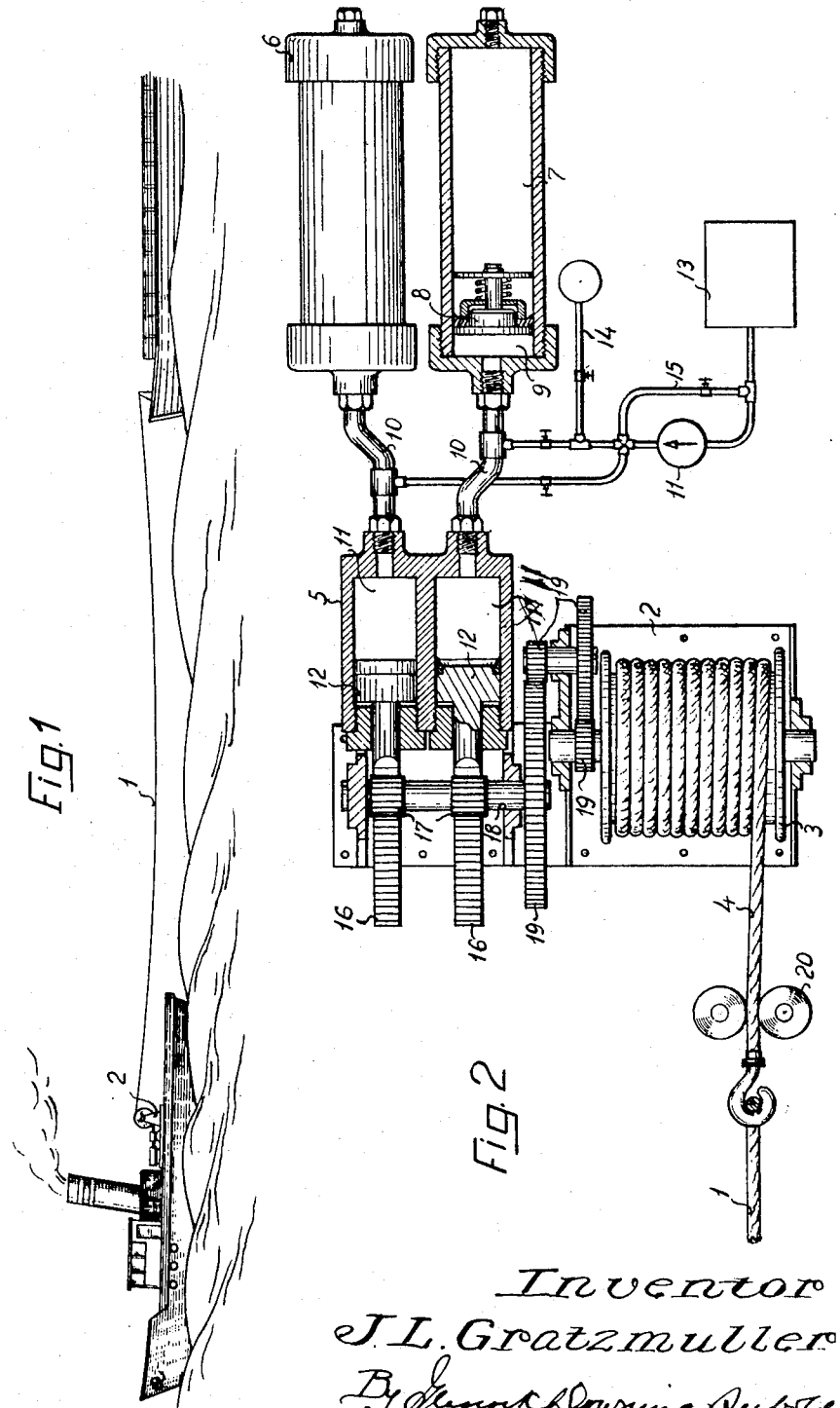
Inventor
J. L. Gratzmuller

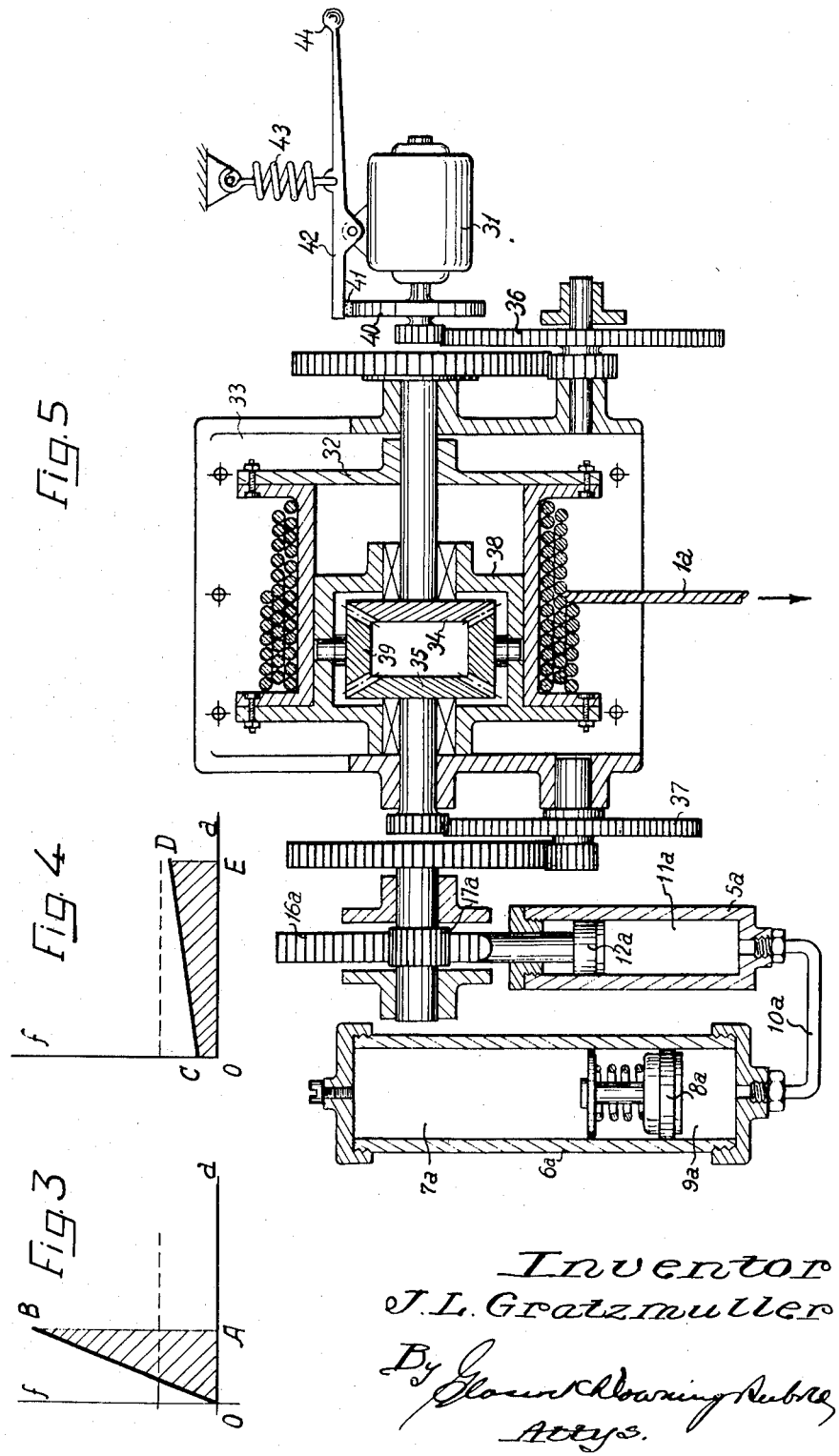

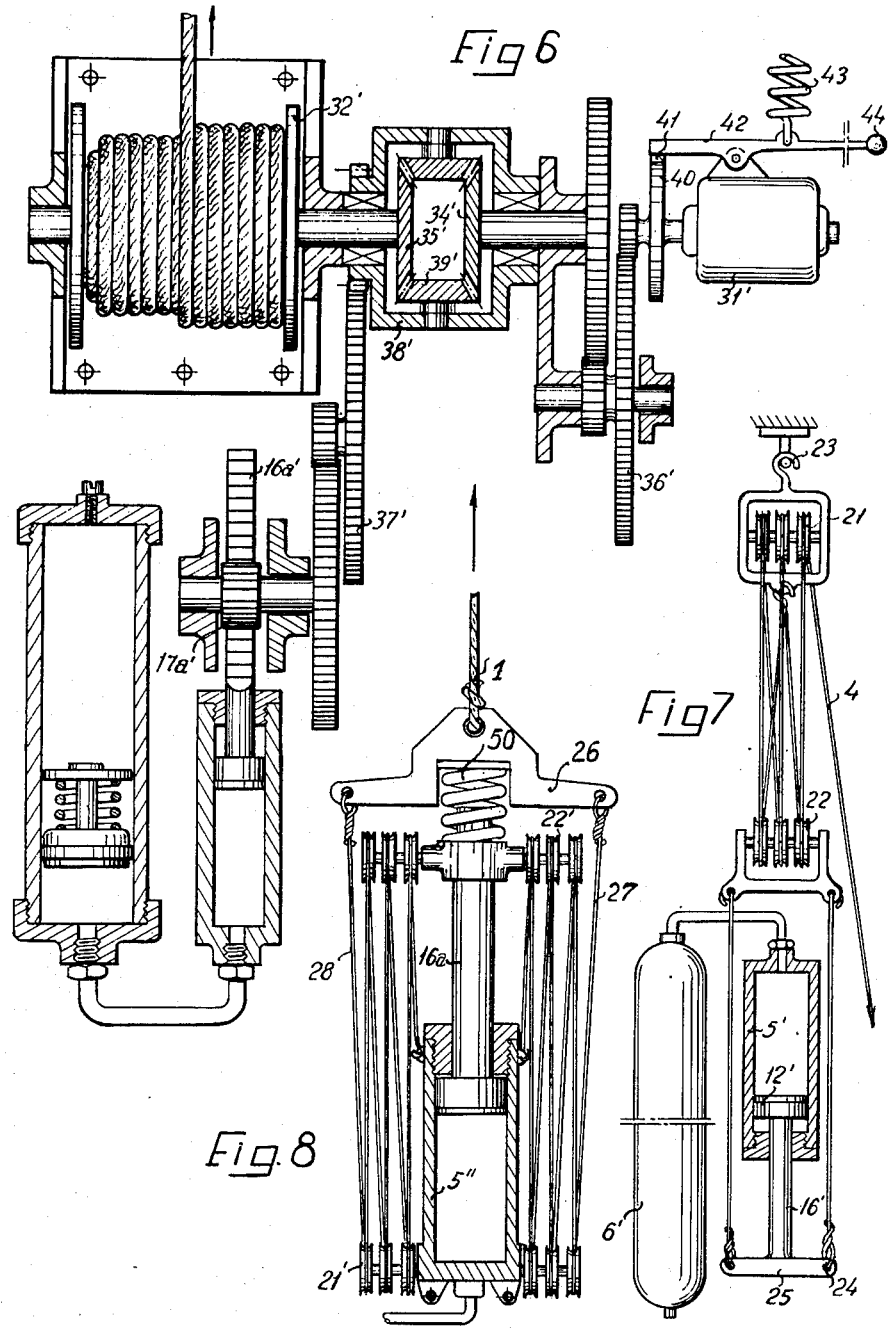

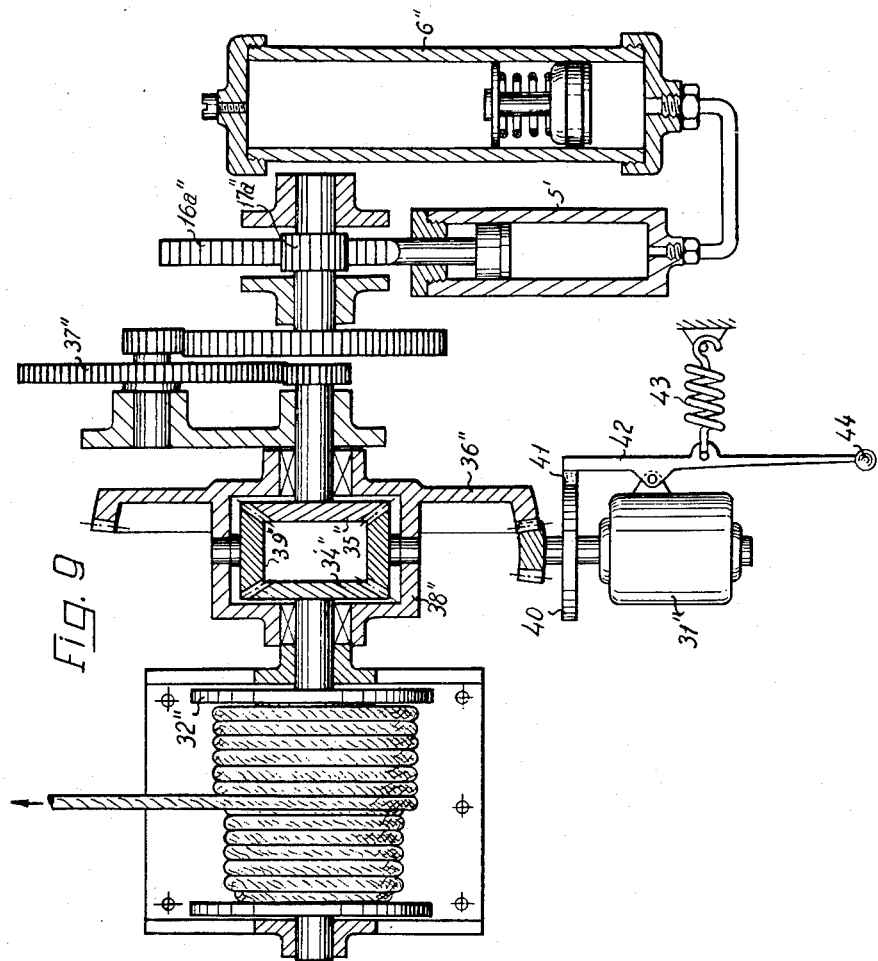

United States Patent Office 2,732,180
Patented Jan. 24, 1956

2,732,180

SAFETY DEVICE FOR CABLE CONNECTIONS

Jean Louis Gratzmuller, Paris, France

Application February 2, 1953, Serial No. 334,489

Claims priority, application France February 12, 1952

10 Claims. (Cl. 254—172)

This invention relates to a safety device interposed in a cable connection and acting automatically when the traction stresses on the cable tend to take a dangerous value, so as to avoid any risk of cable rupture.

There are two main types of cable connections, namely, hauling connections in which a normally fixed length of cable is anchored at each end on one of two separate bodies to establish, for example, a hauling or an anchoring connection between said bodies.

An illustration of this type of cable connection is that used for hauling a wrecked boat from a towboat.

A second type is that of a cable wound on a winch or the like for hauling a movable load.

In both types of cable connections, it often happens that unexpected and violent overloads amounting to a shock on the cable are sometimes liable to cause a break of the same.

This is particularly frequent in the above-mentioned illustration of towing at sea where waves and wind blows often enough to make impossible the use of a simple cable of normally fixed length.

It has been proposed previously to interpose in a cable connection an elastic system capable of yielding when the traction stresses on the cable exceed a predetermined value. None of these systems, however, has proved sufficiently efficient to absorb the huge amount of kinetic energy which is developed in certain cases, such as when trying to take a wrecked boat in tow during a tempest.

According to the invention, there is provided an extra length of cable to be added to the normal cable, said adjunction being normally opposed by a powerful energy storing elastic system comprising one or more pneumatic cushions such as hydropneumatic accumulators or gas cylinders, said system being automatically yieldable when the traction of the cable exceeds a predetermined value and the traction on the cable being transmitted to said system through stress-multiplying, thence displacement reducing means, so that a small yielding displacement of said system permits a considerable increase of the cable length. With this arrangement as soon as the traction on the cable becomes normal again, said elastic system ensures re-winding of the cable extra length.

The main object of the present invention is to provide a cable or tow-line winding mechanism comprising a cable drum and means operable for automatically paying out of the cable to accommodate excess strain thereon and reclaiming the length of cable payed out under excess strain when the same is reduced to normal.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 shows a towing boat provided with a safety device according to the invention.

Fig. 2 is a partly sectional top plan view of an embodiment of such a safety device.

Figs. 3 and 4 are diagrams illustrating the principle of the invention.

Figs. 5, 6 and 9 are partial axial sectional views of three alternative constructive embodiments of a winding device according to the invention.

Figs. 7 and 8 show two alternative constructive embodiments of Fig. 2.

In all figures, the corresponding elements have been designated by the same reference numbers.

Referring first to Fig. 1, there is shown at 1 a cable usually anchored at each end on one of two bodies to be interconnected, such as two boats one of which is towing the other.

According to the invention, cable 1 is anchored on the towing boat through a safety device 2, three embodiments of which are shown in Figs. 2, 7 and 8.

Fig. 3 shows a theoretical diagram of elastic lengthenings (abscissae) versus traction stresses (ordinates) for a cable such as 1 anchored at both ends, while Fig. 4 shows a similar diagram for a cable provided with a safety device 2 according to the invention. In both diagrams, the dashline parallel to the abscissae axis indicates the maximum force supported by the cable before rupture.

The shaded area OAB of Fig. 3 shows the theoretical kinetic energy which would be absorbed by the cable if the same was sufficiently resistant, while the shaded area OCDE of Fig. 4 which is equal to area OAB shows that the same amount of kinetic energy may be absorbed without break if the extension OE of the cable is sufficient. The average value of the traction force of the towing boat is supposedly lower than OC. It may be seen in Fig. 4 that, with a safety device permitting a sufficient extension of the cable, the same is subjected only to stresses materially lower than the rupture value.

In the example shown in Fig. 2, said safety device is essentially constituted by a drum 3 rotatively mounted on a base 2. An extra length of cable 1 which may be constituted, as shown, by a separate extension 4 or alternatively by a portion of cable 1 itself, is automatically unwound from drum 3 when the traction on cable 1 exceeds a predetermined value, said unwinding taking place against the action of a powerful elastic system. In the example shown, said system is essentially constituted by a battery of jacks 5, each communicating with a hydropneumatic accumulator 6 containing in a compartment 7 a cushion of compressed air which acts continuously on a piston 8 separating said compartment 7 from another compartment 9 fed for example with oil from a tank 13. The oil contained in compartments 9 of accumulators 6, ducts 10 and chambers 11 of jacks 5 constitutes a plurality of liquid connecting rods capable of transmitting the displacements of pistons 12 of jacks 5 to pistons 8 of the accumulators 6 against the action of compressed air 7, or vice versa. The volume of said liquid connecting rods is controlled by a pump 111 sucking oil from tank 13 and feeding ducts 10 in parallel, on the one hand, and by a drain 15, on the other hand. A pressure-gauge 14 is provided to control the working pressure. When the volume of the liquid connecting rods becomes insufficient, oil is sent into ducts 10 by means of pump 111; if, on the contrary, the volume is too large, it suffices to open drain 15 to send oil back into tank 13. Pistons 12 are fast with racks 16 meshing with pinions 17 keyed on a common shaft 18 which is connected with drum 3 through suitable multiplying gears 19. Guiding rollers 20 are provided to control winding and unwinding of cable extension 4 on and from drum 3.

The device operates as follows:

When the traction on cable 1 exceeds a predetermined value, cable extension 4 is unwound from drum 3, which determines through gears 19, 17 and racks 16 a penetration of pistons 12 into jacks 5 and, thence, due to the presence of the above-mentioned liquid connecting rods, a corresponding displacement of pistons 8, thus compressing air 7 in accumulators 6. When the traction on cable 1 becomes normal again, the air cushions 7 extend to bring pistons 8 and, thence, pistons 12, into their original position, which causes rewinding of cable extension 4 on drum 3.

In the alternative embodiment of Fig. 7, cable 1, or an extra extension 4 of the same, is wound around two pulleys blocks 21—22 which constitute together a tackle anchored at 23 on a stationary part, for example on a towing boat end at 24, which is on a cross member 25 integral with the rod 16' of piston 12' of a jack 5'. The operation of jack 5' is similar to that of jacks 5 of Fig. 2. It may be seen however, that the tackles 21—22 ensure both unwinding of the extra length of the cable exactly like drum 2 of Fig. 2 and the stroke reduction which was previously ensured by gears 9, 17, 16. Moreover, in the example of Fig. 7, compressed air pressure is directly applied from a gas cylinder 6' on piston 12' of jack 5' which is a pneumatic jack.

In the alternative embodiment of Fig. 8, cable 1 is directly anchored in the middle of a swing bar 26 on the ends of which are anchored, in turn, two extension cables 27—28 having the same function as extension cable 4 of the previous embodiments. Extensions 27 and 28 are wound atlernately on the pulleys 21', 22' of two pulley blocks, said pulleys being distributed on either side of the jack 5''. The axis of pulleys 22' is integral with the piston rod 16a, of jack 5'', as previously stated.

This arrangement offers the additional advantage that jack 5'' is located within the tackle, which permits making the system more compact than in Fig. 7. Spring 50 has one end anchored on rod 16a, the swing bar 26 bearing on the other end of said spring when the cable is loosened.

In Fig. 7, one end of the extension cable is anchored on a stationary part such as pulley block 21, while in Fig. 8, the ends of the extension cables 27—28 are anchored on the cylinder of jack 5''.

The operation of the device of Fig. 8 is similar to that of Fig. 7.

Referring now to Figs. 5, 6 and 9, there is shown a winding apparatus provided with a safety device according to the invention, so that when the cable is subjected to a traction exceeding a predetermined value, the winding conditions are automatically modified to absorb a portion of the objectionable stresses.

According to the invention, the winding device is provided with a differential, the three main elements of which are rotatively linked with driving means such as a motor 31, the rotating drum 32 of a winch 33 and a pinion 17a meshing with a rack 16a fast with the piston 12a of a jack 5a communicating with a hydropneumatic accumulator 6a the piston of which is shown at 8a. The jack 5a and accumulator 6a together with a connecting pipe 10a constitute an elastic system which provides a yielding resistance to increased stress in cable 1a due to suddenly increased load. The accumulator 6a is divided into two compartments of variable volume 7a, 9a by the piston 8a, compartment 7a contains a cushion of compressed air which acts continuously on piston 8a, and compartment 9a is fed with oil from chamber 11a of jack 5a through the connecting pipe 10a. The operation of the elastic system constituted by jack 5a and accumulator 6a is exactly as in the previous embodiments. The oil contained in compartment 9a, pipe 10a and chamber 11a acts as a liquid connecting rod capable of transmitting the displacement of piston 12a of the jack to piston 8a of the accumulator against the action of the compressed air contained in compartment 7a of the accumulator, or vice versa. When that element of the differential which is rotatively linked with pinion 17a is subjected to stresses higher than a predetermined value, said elastic system yields to permit rotation of said element, while when said value tends to become normal again, said elastic system causes a rotation in the opposite way of said element to bring the same into its original position again. Thence, as long as the traction stresses on cable 1a do not exceed a predetermined value, said cable is wound or unwound on, or from, drum 32 under the control of motor 31 at a given speed, the transmission of the rotation taking place through the two other elements of the differential, while that element which is rotatively linked with pinion 17a remains stationary. If, however, cable 1a is subjected from external forces to prohibitive stresses, the torque transmitted to the elastic system overcomes the resisting torque of that element of the differential which is linked with pinion 17a, so that said element is rotated against the action of the elastic system.

In the example shown in Fig. 5, motor 31 and pinion 17a are respectively linked with the sun-wheels 34 and 35 of the differential through gears 36—37, respectively, while drum 32 is directly fast in rotation with cage 38 of the differential of which the planet-wheels 39 mesh with the sun-wheels 34—35 in the usual manner.

In the alternative embodiment of Fig. 6, sun-wheel 34' is still linked with motor 31' through gears 36', but pinion 17a' is linked with cage 38' also through gears 37', while drum 32' is directly fast in rotation with the second sun-wheel 35'.

In the alternative embodiment of Fig. 9, drum 32'' and pinion 17a'' are linked with the sun-wheels 34'' and 35'', the first one directly, the second one through a gear train 37'', while motor 31'' is linked with cage 38'' through a gear train 36''.

The three embodiments of Figs. 5, 6 and 9 only differ from each other in the transmission ratios between the motor and drum, between the drum and the elastic system and between the motor and elastic system, respectively.

Finally, it will be understood that when the motor is at rest, its resisting torque is not sufficient to hold that element of the differential gear with which it is rotatively linked stationary against the action of the load. To overcome this drawback, there is provided, according to another feature of the invention, a braking device interposed between the motor and that element of the differential with which said motor is linked.

In the example shown, said braking device is constituted by a disk 40 keyed on the motor driving shaft and on the periphery of which a shoe 41, carried by a lever 42, exerts a friction under the action of a spring 43. A handle 44 permits releasing disk 40 from the friction of shoe 41 when the motor runs.

It is to be noted that when the motor is held stationary by the above described means, the winding device can be used advantageously instead of the embodiment of Figs. 2, 7 and 8, for example for towing.

In this case, the differential establishes direct connection between the drum and the elastic system, but with the additional advantage of permitting varying at will the useful length of the cable, by winding more or less the cable under the action of the motor.

The invention is not intended to be limited to the examples described and shown, not otherwise than defined in the appended claims.

In particular, instead of using the type of differential shown and described, in which the sun-wheels are equal, any desired other type of differential may be adopted in order to provide a gear combination giving in itself, without the use of the other reducing gear, the highest possible speed to that element of the differential which is linked with the motor and the lowest possible speed to that element of said differential which is linked with the elastic system. Furthermore, in the case when several jacks and several accumulators are provided, the jacks can be interconnected with the accumulators, either separately, or in parallel.

What is claimed is:

1. A cable winding mechanism comprising in combination, a rotatable drum adapted to have a cable wound thereabout, a drive motor, a shaft driven by said motor, a differential gearing means including plural rotatable components, one component of said differential means being operably coupled with said drive shaft, a second component of said differential means being operably coupled with said drum, a cylinder, a reciprocal piston mounted within the cylinder, resilient means operably associated with said piston to constitute a yielding resistance opposing the movement of the piston in one direction, gearing means operatively coupling a third component of said differential to said piston whereby the resistance of the piston against axial displacement in said direction will, through said differential means, cause said drive shaft to rotate said drum so as to wind on or unwind cable from the drum while resistance of said drum against cable winding rotation will cause said drive shaft to tend to move said piston through the action of said differential gearing means in said one direction and braking means operatively associated with said drive shaft and operable to hold said drive shaft against rotation whereby rotation of said drum in a cable unwinding direction will tend to advance said piston in said one direction.

2. A cable winding device comprising in combination a rotatable drum adapted to have a cable wound thereabout, a motor, a drive shaft driven by said motor, a differential gearing means including plural rotatable components, one of said components being connected to said drive shaft, and a second of said components being operably connected to said drum, a liquid pressure cylinder, a reciprocal piston within said cylinder, a cylindrical container, a slideable partition means within said container for dividing the same into variable volume liquid and gas pressure chambers respectively, said gas pressure chamber having a supply of gas under pressure therein, means providing communication between the liquid pressure chamber of the container and the liquid pressure cylinder whereby gas under pressure in the gas pressure chamber of the container exerts a progressively increasing yielding resistance to any axial displacement of the piston in a direction tending to force pressure liquid from said cylinder into said liquid pressure chamber, gearing means operatively coupling a third component of said differential gearing means with said piston whereby the yielding resistance to axial displacement of the piston will cause the drive shaft to rotate the drum through said differential gearing to wind on or unwind cable relative to the drum, while resistance of said drum against cable winding rotation will cause said drive shaft to tend to move said piston in said one direction, and braking means operatively associated with said drive shaft and adapted to hold said drive shaft against rotation whereby rotation of said drum in a cable unwinding direction will tend to move said piston against the yielding resistance exerted by gas under pressure in said gas pressure chamber.

3. A cable winding mechanism comprising in combination a rotatable drum adapted to have a cable wound thereabout so that rotation of said drum in opposite directions will respectively wind and unwind the cable relative to the drum, a motor, a drive shaft operatively coupled with said motor for rotating said drum to wind on or unwind cable therefrom, a liquid pressure cylinder, a reciprocal piston within the cylinder, a cylindrical container, a slideable partition within the container for dividing the same into a liquid pressure and a gas pressure chamber respectively, said gas pressure chamber having a supply of gas under pressure therein, means providing communication between the liquid pressure chamber of the container and said liquid pressure cylinder whereby movement of the piston in one direction tends to force pressure liquid from the cylinder into the liquid pressure chamber, the movement of the fluid into the liquid pressure chamber being opposed by a yielding resistance of the gas under pressure in the gas pressure chamber, a differential gearing means including plural rotatable components, a driving connection between the drive shaft and one of the components of the differential gearing, a driving connection between said drum and a second component of the differential gearing and a driving connection between the piston and a third component of the differential gearing, at least the last mentioned driving connection including a speed reducing gearing means and braking means operatively associated with said drive shaft and selectively operable to prevent rotation thereof.

4. A cable winding mechanism comprising in combination a rotatable drum adapted to have the cable wound thereabout and rotatable in opposite directions to pay-out or take-in the cable, a motor, a drive shaft for the motor, a differential mechanism including a rotatable cage having opposed planet gear means thereon and opposed sun gear means meshing with the planet gear means, means operatively coupling said drive shaft with one of said gear means for driving the same, means operatively connecting said drum to another of said gear means, a liquid pressure cylinder having a piston reciprocally mounted in the cylinder, means operatively connecting said piston to another of said gear means, resilient means operatively associated with said piston and providing a yielding resistance to the movement thereof in one direction whereby the resistance against displacement of the piston in said one direction will cause the drive shaft to rotate the drum through the differential gearing mechanism so as to wind on or pay-out the cable while resistance of the drum against cable winding rotation will cause the drive shaft to tend to move the piston in said one direction through said differential mechanism and braking means operatively associated with the drive shaft and selectively operable to hold the drive shaft against rotation whereby rotation of the drum to pay-out cable will tend to advance the piston in said direction.

5. A cable winding mechanism as claimed in claim 4 and reducing gearing interposed between at least one of said gear means and one of the components constituted by the drive shaft and the piston.

6. A cable winding mechanism as claimed in claim 4 and reducing gearing interposed between the piston and the differential gearing mechanism.

7. A cable winding mechanism as claimed in claim 4 and reducing gearing interposed between the differential gear mechanism and the piston and drive shaft respectively.

8. A cable winding mechanism as claimed in claim 4 in which said drive shaft is operatively coupled with said cage and said drum and piston are respectively operatively coupled with said opposed sun gears.

9. A cable winding mechanism as claimed in claim 4 in which said drum is operatively coupled with said cage and said drive shaft and piston are respectively operatively coupled with said opposed sun gears.

10. A cable winding mechanism as claimed in claim 4 in which said piston is operatively coupled with said cage and said drive shaft and drum are respectively operatively coupled with said opposed sun gears.

References Cited in the file of this patent

UNITED STATES PATENTS

| | | |
|---|---|---|
| 2,417,166 | Johnson | Mar. 11, 1947 |
| 2,436,752 | Johnson | Feb. 24, 1948 |